July 21, 1942. S. B. WINN 2,290,308
TRAILER VEHICLE
Filed Dec. 23, 1939 3 Sheets-Sheet 1

Inventor
SIDNEY B. WINN.
By
Attorney

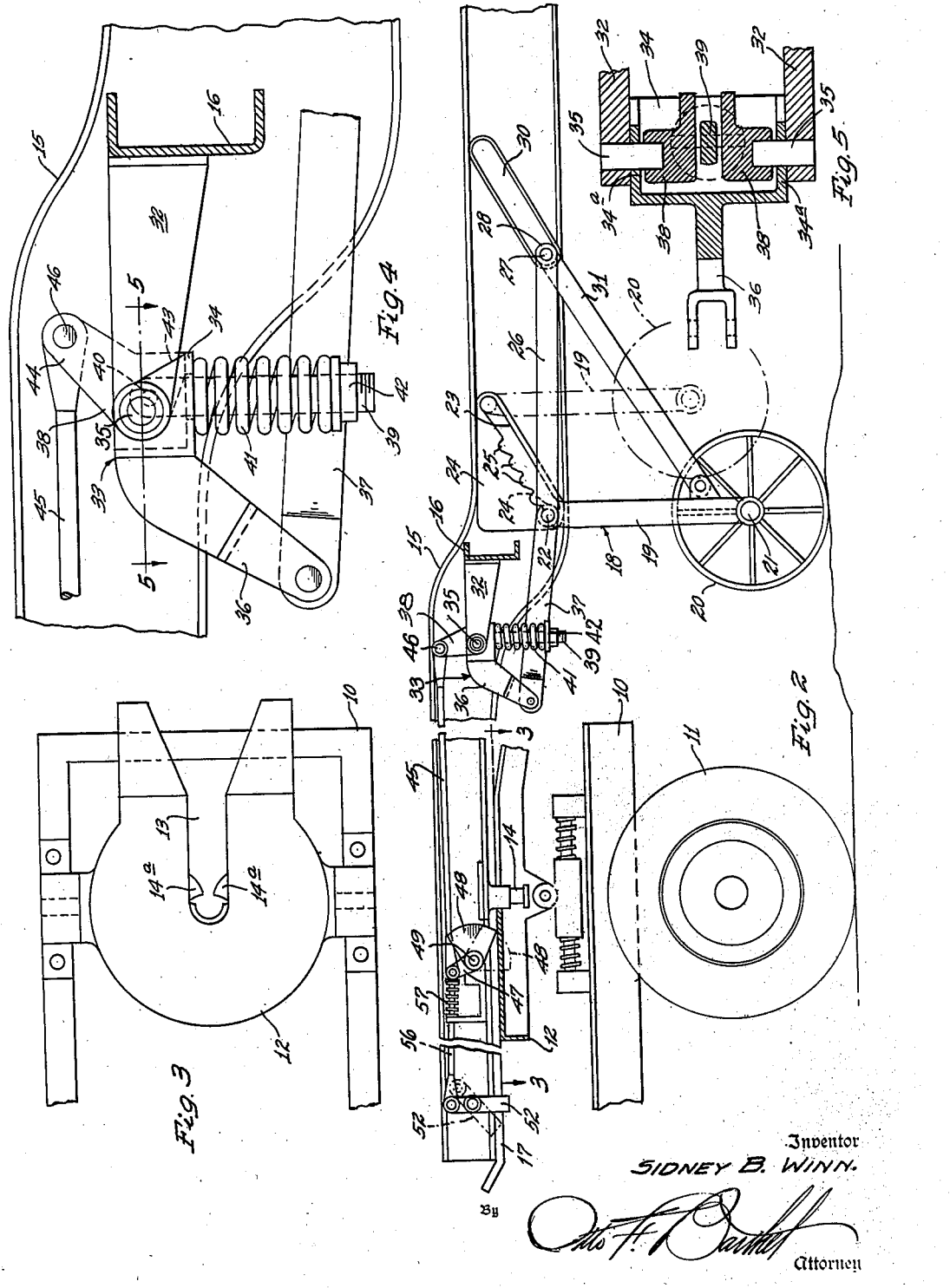

Inventor
SIDNEY B. WINN.

Patented July 21, 1942

2,290,308

UNITED STATES PATENT OFFICE 2,290,308

TRAILER VEHICLE

Sidney B. Winn, Lapeer, Mich.

Application December 23, 1939, Serial No. 310,736

8 Claims. (Cl. 280—33.1)

This invention relates generally to vehicles and more particularly to trailer vehicles.

It is an object of the present invention to provide a new and improved trailer vehicle of the type having a prop arranged to be raised and lowered and to insure against breakage or damage to the prop raising structure if, for any reason, raising of the prop should be resisted other than by force of gravity.

Another object of the invention is to provide new and improved trailer prop lifting mechanism operable by and prior to coupling of a tractor to a trailer.

A further object of the invention is to provide new and improved safety means for preventing separation of a tractor and trailer in the event that the trailer prop is in raised position.

Other objects of the invention will become apparent from the following detailed description of the invention taken together with the accompanying drawings in which—

Fig. 2 is a view showing a rear end portion of a tractor and a front end portion of the trailer coupled thereto, this view being taken substantially centrally and longitudinally of the vehicles;

Fig. 3 is a top plan view of the rear end portion of the tractor, taken along the line 3—3 of Fig. 2;

Fig. 4 is an enlarged fragmentary view of certain details of the invention,

Fig. 5 is a sectional view taken along the line 5—5 of Fig. 4,

Figure 1:
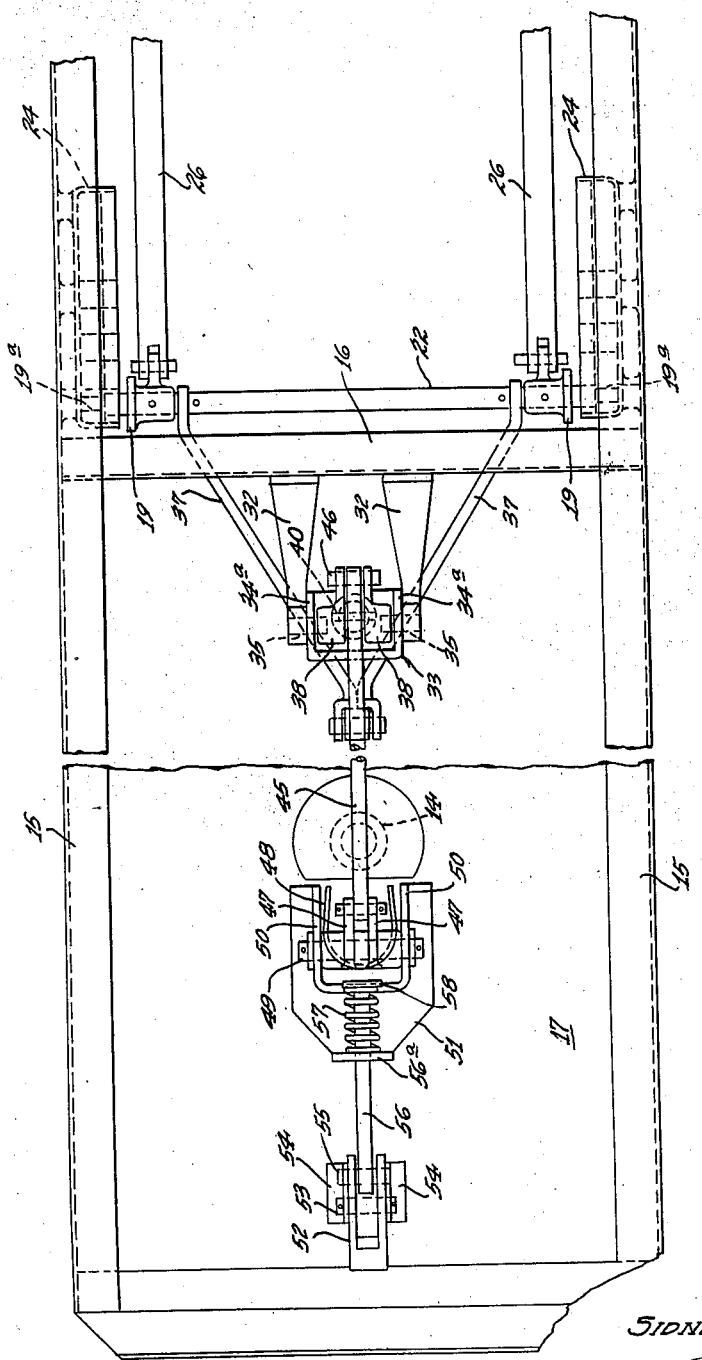
Figure 1 is a top plan view of a trailer vehicle embodying features of the invention.
Figure 6:
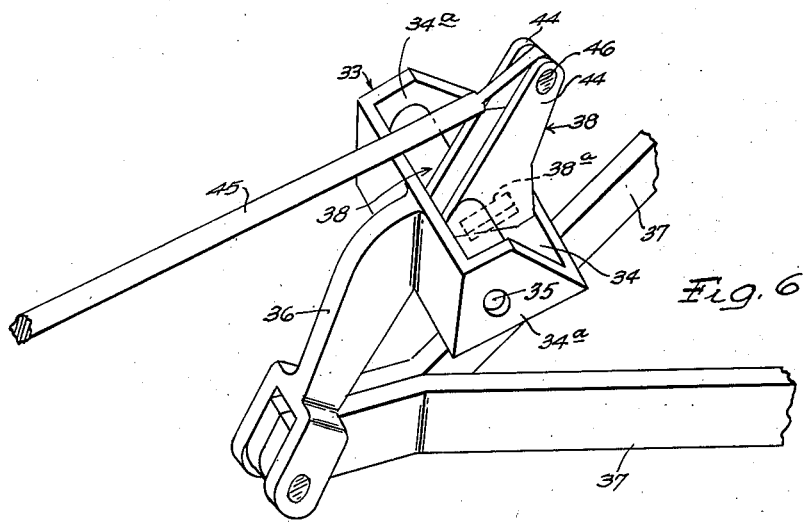
Fig. 6 is a perspective view of certain details of the invention.
Figure 7:
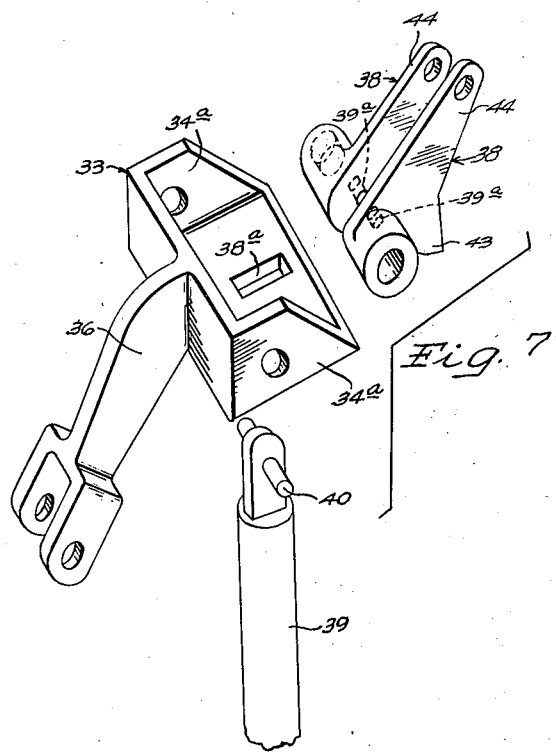
Fig. 7 is an exploded perspective view of some of the parts shown in Fig. 6.

Referring to the drawings by characters of reference, the tractor may be of any suitable type and includes a frame 10 supported in part by rear wheels 11 and includes a fifth wheel 12 mounted on the frame 10 to pivot about an axis transverse thereto. The fifth wheel 12 is provided with the usual slot 13 to receive a king pin 14 carried by the trailer, the king pin being held to the fifth wheel 12 by pivoted, releasable coupling members 14a. The above structure is well known in the art to which the present invention appertains and therefor a detailed description of the structure is deemed unnecessary.

The trailer includes a support or frame comprising spaced, longitudinal frame members 15 which are rigidly secured together in part by a transverse frame member 16 and are further secured together by a supporting plate 17 which is secured to the underside of the longitudinal frame members 15. The trailer, of course, is provided with rear wheels (not shown) and forwardly of the rear wheels, a prop 18 is provided to support the front of the frame when the trailer is not being supported by a tractor, the prop having raised and lowered positions. Preferably, the prop 18 includes a pair of transversely spaced, upright supports 19 provided at their lower ends with ground engaging wheels 20 which may be mounted on a shaft 21 having its opposite ends supported in aligning apertures in the uprights 19. The upper ends of the upright members 19 are connected by a rod or shaft 22 which on its opposite ends is preferably provided with rollers for rolling on inclined surfaces 23 of riser members 24 which are rigidly secured one to each of the frame side members 15 inwardly thereof. Spaced above the inclined surfaces 23, the risers 24 are provided with a plurality of downwardly facing steps or notches 25 which are spaced on an incline substantially parallel with their respective inclined surfaces 23. These notches 25 provide at varying heights, seating sockets to receive the shaft 22 which will engage in a pair of the notches of opposite risers when the prop is lowered, the pair of notches receiving the shaft being determined by the level of the ground engaged by the prop wheels 20. Spaced connecting members or links 26 have ends thereof connected to the upper prop shaft 22 and extending longitudinally and toward the rear of the trailer frame the links 26 have their opposite ends connected to a transverse shaft or rod 27 which is preferably provided on its opposite ends with rollers 28 to engage in inclined guideways 30, provided in the side frame members 15. Also connected to the rod 27 is a pair of bracing connecting links 31 having their lower ends connected respectively to the uprights 19, adjacent the lower ends thereof.

As illustrated in Fig. 2 of the drawings, it sometimes occurs that on lowering the prop 18 to park a trailer, a wheel or wheels thereof rest on higher ground than the ground on which the tractor rests. Under this condition, the front end of the trailer is higher than it would be if the prop wheels 20 were on level ground so that when a tractor is again backed under the forward part of the trailer, the trailer front end if lifted at all by the tractor is likely not to be sufficiently lifted to permit the shaft 22 to descend clear of the notches, and, as a result, the prop cannot be lifted by its power or lifting means.

Then, again, in the event of an unduly heavy load on the trailer, the tractor springs might permit the tractor frame to descend so far that the prop would not leave the ground or would be retained by the holding notches.

A pair of spaced brackets 32 which are rigidly secured to the frame cross member 16, support therebetween a lever 33 which on one end thereof is provided with a bottom wall 34 having oppositely disposed upstanding flanges 34a which are apertured to receive pivot pins 35 by means of which the lever 33 is pivoted to the brackets 32. The lever 33 is provided with a downwardly extending arm 36 to the lower end of which is pivotally connected, ends of a pair of spaced connecting links or push rods 37 which have their opposite or rear ends pivotally connected to the transverse prop rod 22. Also pivoted to the brackets 32 by the pins 35 is a pair of spaced levers 38 which are positioned between the sides of flanges 34a of the lever 33 and one end of a rod 39 positions between and is pivoted to the levers 38 by a transverse pin 40, the rod 39 extending upwardly through an aperture 38a provided in the bottom wall 34 of the lever 33. The rod 39 is pivoted to the levers 38 in bored recesses 39a which are located off center or eccentric with respect to the pivot of the levers whereby to provide a lever arm. Surrounding the rod 39 is a helical coil spring 41 having its upper end abutting the underside of bottom wall 34 and having its lower end abutting an adjustable abutment 42 which is screwthreaded onto the lower end of the rod to adjust compression of the spring 41. The spring 41 constitutes a lost-motion or yieldable connection between levers 38 and lever 33 for the purpose of preventing breakage of the prop lifting mechanism in the event the prop will not rise when the tractor is backed into the trailer. The levers 38 are each provided with a downwardly directed arm 43 which are adapted to seat at their lower ends on the upper surface of the lever bottom wall 34 to act as stops for the levers 38 and the levers 38 are further provided with upwardly directed arms 44 between which one end of a rod 45 is pivotally connected to the levers 38 by a pivot pin 46. The other or forward end of the rod 45 is pivotally connected to and between a pair of arms 47 of a lever 48 which is arranged to be pivoted by the fifth wheel of the tractor, see Figs. 1 and 2, to raise the trailer prop. The lever 48 is pivoted by a pin 49 to upstanding flanges 50 of a bracket 51 which is rigidly secured to the supporting plate 17, the width of the lever 48 being greater than the width of the fifth wheel slot 13. Through the plate 17 is provided a slot to receive the lever 48 so that the lever may extend below the plate for engagement with the upper surface of the fifth wheel.

Disposed forwardly of the lever 48, is a retractible abutment member 52 which is pivoted by a pin 53 to and between upstanding flanges of brackets 54 which may be suitably and rigidly secured to the plate 17. The upper end of the abutment member 52 is bi-furcated to receive one end of an operating rod 56 which is pivoted by a pin 55 to the member 52, the rod 56 extending freely through an aperture in an upturned flange 56a of the bracket 51. The member 52 is a safety means operable and releasably held by the prop lifting mechanism for abutment by the forward edge of the fifth wheel 12 to prevent complete separation of the vehicles when the prop is in raised position. Surrounding the rod 56 on the opposite side of the flange 56a from the abutment member 52 is a coiled spring 57 having one end thereof abutting the flange 56a and having its other end abutting a head 58 on the free end of the rod 56, the rod head 58 also being arranged for abutment with the levers 47. The spring 57 acts to pivot the abutment member 52 in a clockwise direction, facing Fig. 2 or to the position shown in the dotted lines, in which position, the lower end of the abutment member is above the lower surface of the plate 17 to permit complete separation of the vehicles.

In operation, when the tractor is backed under the forward end of the trailer, Fig. 2, preparatory to coupling of the vehicles together, the lever 48 rides up onto the fifth wheel 12 and is pivoted thereby in a counterclockwise direction which through the connecting rod 45 pivots the lever 33 in a counterclockwise direction. If the tractor and the trailer are standing on substantially level ground, the backing of the tractor beneath the forward end of the trailer will normally lift the forward end of the trailer sufficiently such that the prop rod 22 will descend clear of the notches 25 and the prop will be free to be raised. This is true provided that there is not an excessive load on the trailer which would cause the prop to remain in the retaining notches 25 due to compression of the tractor springs. When the above mentioned condition exists, the pivoting of lever 38 acts through the spring 41 to pivot the lever 33 in a counter- clockwise direction which acting through the connecting links or push rods 37 push the prop structure 18 up its risers to the raised position shown in dotted lines, Fig. 2. If it should happen that the trailer is left standing with its prop resting on raised ground or on a curb or on ground higher than the ground on which the rear wheels of the tractor rest, it will be seen that the backing of the tractor beneath the trailer might not raise the forward end of the trailer sufficiently to permit the prop rod 22 to descend clear of the notches 25 in which event the prop will be caught and held against movement to its raised position. Usually, a truck driver will continue to back his truck into the trailer in an attempt to couple the vehicles and as a result, the landing gear or prop and associated structure is broken. In my trailer there is a lost-motion provided between levers 33 and 38 by reason of their connecting spring 41 which if the prop rod is held in the notches 25 is then further compressed preventing breakage of or injury to the prop lifting rods, levers, etc. This stores a force in the spring 41 which acts to raise the prop. After the king-pin 14 is coupled to the fifth wheel 12 by the releasable holding levers 14a and the vehicles move away, such that the prop rides off the raised ground, the prop 18 will descend by gravity and the prop rod 22 will descend clear of the notches 25, and when this occurs, the potential force stored in the spring 41 by reason of the lost motion between levers 33 and 36 is released and raises the prop. When the tractor is backed under the trailer and the lever 48 is pivoted by the fifth wheel in a counterclockwise direction, the arms 47 of the lever 48 engage and push the rod 56 forwardly which swings the pivated abutment member 52 downwardly to the position shown in full lines, Fig. 2, in which position the lower end of the abutment member 52 projects below the lower surface of the plate 17, in position for abutment by the forward end of the fifth wheel. The provision of the abutment member 52 is a safety measure to prevent complete separation of the vehicles when, if for any reason, the prop on separation of the vehicles should not descend to its lower position.

On uncoupling of the vehicles, after coupling members 14a are withdrawn to release the kingpin 14, the tractor may be drawn away from the trailer and as the lever 48 leaves the tractor fifth wheel 12 the lever swings downwardly until it reaches the position shown in dotted lines, Fig. 2. This permits the rod 45 to move rearwardly of the vehicle and levers 33 and 36 to pivot clockwise which permits the prop 18 to descend by gravity to its ground engaging position and also permits spring 57 to swing the abutment member 52 out of the way of the fifth wheel to permit separation of the vehicles.

While I have shown and described my invention in detail, it is to be understood that the same is to be limited only by the appended claims for many changes may be made without departing from the spirit and scope of the invention.

What I claim is:

1. In a trailer for coupling to a tractor, a frame supported in part by rear wheels, a prop supporting the front end of the frame and movable to a raised ineffective position, said prop having a bearing member, a downwardly facing notch on said frame to receive said bearing member to effect support of the frame, said frame normally being raised by and upon movement of a tractor therebeneath which frees said bearing member from said notch and permits raising of said prop, a lever fulcrumed on said frame and operatively connected to said prop, lever means fulcrumed on said frame, spring means operatively connecting said lever and said lever means, means to exert a force on said lever means when the tractor is moved beneath the trailer and thereby causing a force to be stored in said spring means, said spring means upon failure of said bearing member to move out of said notch having a force stored therein operable to move said prop to its raised position when said bearing does clear said notch.

2. In a trailer for coupling to a tractor, a frame supported in part by rear wheels, a prop supporting the front end of the frame and movable to a raised ineffective position, said prop having a bearing member engageable in a downwardly facing notch on said frame, a lever member, fulcrum means on said frame for said lever member, said lever member having a plate-like arm extending substantially parallel to the axis of said fulcrum means, lever means mounted on said fulcrum means and movable relative to said lever member, a rod extending through an aperture in said plate-like arm and connected to said lever means, said rod having an abutment spaced from said plate-like arm, a helical coil spring surrounding said rod having one end abutting said abutment and the other end engaging said plate-like arm so that the spring will either transmit movement of said lever means to said lever member or be compressed by movement of said lever means.

3. In a trailer vehicle adapted to be coupled to a tractor, a frame supported by rear wheels, a prop forwardly of the trailer, means on said frame to engage said prop to support the forward end of the trailer, a first member for raising said prop to an ineffective position, a second member movable longitudinally on said trailer from a forward to a rearward position, means cooperable with the tractor to cause forward movement of said second member upon placing of the tractor beneath the trailer, and resilient means interposed between said first member and said second member exerting a force on said first member to raise said prop to ineffective position when said second member is in forward position and permitting full movement of said second member to forward position despite failure of said first member to raise said prop to ineffective position.

4. In a trailer vehicle adapted to be coupled to a tractor, a frame supported by rear wheels, a prop forwardly of the trailer, means on said frame to engage said prop to support the forward end of the trailer, a first member for raising said prop to an ineffective position, a second member movable longitudinally on said trailer from a forward to a rearward position, means cooperable with the tractor to cause forward movement of said second member upon placing of the tractor beneath the trailer, and resilient means interposed between said first member and said second member exerting a force on said first member to raise said prop to ineffective position when said second member is in forward position and permitting full movement of said second member to forward position despite failure of said first member to raise said prop to ineffective position and in said last named event exerting a force upon said first member to cause it to raise said prop to ineffective position upon remedying of the condition causing failure of said first member to raise said prop to ineffective position.

5. In a trailer vehicle adapted to be coupled to a tractor, a frame supported by rear wheels, a prop forwardly of the trailer, means on said frame to engage said prop to support the forward end of the trailer, a first member for raising said prop to an ineffective position, a second member movable on said trailer from a first position to a second position, means cooperable with the tractor to cause movement of said second member from its first position to second position upon placing of the tractor beneath the trailer and resilient means interposed between said first member and said second member exerting a force on said first member to raise said prop to ineffective position when said second member is in its second position and permitting full movement of said second member to its second position despite failure of said first member to raise said prop to ineffective position.

6. In a trailer vehicle adapted to be coupled to a tractor, a frame supported by rear wheels, a prop forwardly of the trailer, means on said frame to engage said prop to support the forward end of the trailer, a first member for raising said prop to an ineffective position, a second member movable on said trailer from a first position to a second position, means cooperable with the tractor to cause movement of said second member from its first position to its second position upon placing of the tractor beneath the trailer, and resilient means interposed between said first member and said second member exerting a force on said first member to raise said prop to ineffective position when said second member is in its second position and permitting full movement of said second member to its second position despite failure of said first member to raise said prop to ineffective position and in said last named event exerting a force upon said member to cause it to raise said prop to ineffective position upon remedying of the condition causing failure of the said first member to raise said prop to ineffective position.

7. In a trailer vehicle adapted to be coupled to a tractor, a frame supported by rear wheels, a prop forwardly of the trailer, means on said frame to engage said prop to support the forward end of the trailer, a member for raising said prop to an ineffective position, means adapted to cooperate with a portion of the tractor serving to actuate said member to raise the prop when the tractor is positioned beneath the trailer and to lower the prop when the tractor is removed from beneath the trailer and auxiliary means adapted to engage another portion of the tractor serving to prevent separation of the tractor and trailer in the event of failure of said first mentioned means to lower the prop upon removal of the tractor from beneath the trailer, said auxiliary means having connection with said prop actuating member whereby an additional force is exerted on said member to lower said prop in the event of failure of said first named means to lower the prop.

8. In a trailer vehicle adapted to be coupled to a tractor, a frame supported by rear wheels, a member for raising said prop to an ineffective position, means cooperable with a portion of the tractor to cause said member to raise the prop to ineffective position as the tractor is backed beneath the trailer and to lower the prop as the tractor is removed from beneath the trailer, and auxiliary means pivotally supported adjacent the forward end of the trailer and having a position preventing complete separation of the tractor and trailer, and a second position permitting separation of the tractor and trailer, said auxiliary means being in the first named position when said prop is in raised position and being in said second position when said prop is in lowered position, and said auxiliary means having connection with said prop actuating member whereby an additional force is exerted on said member to lower the prop when the operator attempts to separate the tractor and trailer and the prop fails to be lowered.

SIDNEY B. WINN.